(12) United States Patent
Gregoire

(10) Patent No.: US 8,602,332 B2
(45) Date of Patent: Dec. 10, 2013

(54) DOMESTIC METHOD FOR PROCESSING ORGANIC WASTE

(76) Inventor: Eric Gregoire, Gallargues le Montueux (FR)

( * ) Notice: Subject to any disclaimer, the term of this patent is extended or adjusted under 35 U.S.C. 154(b) by 378 days.

(21) Appl. No.: 12/992,438

(22) PCT Filed: May 19, 2009

(86) PCT No.: PCT/FR2009/000581
§ 371 (c)(1),
(2), (4) Date: Nov. 12, 2010

(87) PCT Pub. No.: WO2009/150322
PCT Pub. Date: Dec. 17, 2009

(65) Prior Publication Data
US 2011/0062259 A1    Mar. 17, 2011

(30) Foreign Application Priority Data
May 19, 2008   (FR) ..................................... 08 02692

(51) Int. Cl.
*B02C 23/00*   (2006.01)
*B02C 21/00*   (2006.01)

(52) U.S. Cl.
USPC .............................................. 241/18; 241/62

(58) Field of Classification Search
USPC .................... 241/62, 18, 25, 24.1, 68, 235
See application file for complete search history.

(56) References Cited

U.S. PATENT DOCUMENTS 5,035,189 A      7/1991  Lunsford
5,368,240 A *  11/1994  Bonnet ........................... 241/41

FOREIGN PATENT DOCUMENTS

| EP | 1210989 A | 6/2002 |
|---|---|---|
| IT | 1502667 A | 2/2005 |
| JP | 1170354 A | 1/2002 |
| WO | 2004024335 A | 3/2004 |
| WO | 2006097952 A | 9/2006 |

* cited by examiner

*Primary Examiner* — Faye Francis
(74) *Attorney, Agent, or Firm* — Egbert Law Offices, PLLC

(57) ABSTRACT

The invention relates to a method and device for processing organic, particularly domestic, waste, wherein the organic matter is collected, reduced in volume, and stabilized to limit or even stop bacterial activity. The method includes at least the following steps, carried out in order: —the organic material is collected and loosely arranged; —the water weight of the organic matter is reduced to stabilize the matter by subjecting said loose matter to a pulsed air flow taken from the ambient air of the building and without any additional heat the volume of the stabilized organic material is reduced, in particular by milling, comminution, mixing and pressing.

13 Claims, 2 Drawing Sheets

DOMESTIC METHOD FOR PROCESSING ORGANIC WASTE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention concerns a domestic method for processing domestic waste, wherein the organic matter is collected, reduced in volume and stabilised.

By stabilising is meant the action of making the organic matter inert so as to stop microbacterial activity and thereby their odour, at least for a certain time (a few days or weeks). The fermentation process is thus put in standby.

The method according to the invention thus enables to transform the organic matter from their initial waste status into a more recyclable product, which is in particular less cumbersome and less off-putting.

This product may particularly find an application, for instance, in one of the destination channels such as compost preparation, methanisation or still as a fuel, especially for the production of electricity.

The invention also relates to a domestic device for processing organic matter suitable for implementing the method. This device is domestic, with dimensions enabling integration in a habitat such as for example in a kitchen.

2. Description of Related Art

Including Information Disclosed Under 37 CFR 1.97 and 37 CFR 1.98.

Document WO 2004/024355 or document WO 2006/097952, disclose a method for processing organic waste which may be considered as part of the state of the art of the present invention.

More particularly, the method implemented in document WO 2004/024355 includes the succession of the following steps and, conducted in this order:

collecting the organic matter, reducing the organic matter into smaller pieces, particularly by means of a shredder, a chopping machine, a masher, etc., drying the products sufficiently so as to lower the microbiological activity, for instance by pressing, elaboration, sublimation, particularly using different means such as heating or still ventilation means.

This method can have several variations particularly wherein water is added for easier reduction of matter, especially so as to form a sludge which may be mixed with a binder. This water uptake must however be then withdrawn during the drying in order to stabilise the products, which renders the method particularly energy greedy.

Document WO 2006/097952 discloses a comparable method which is implemented and allows to transform organic matter into inert matter in the form of bricks.

The device of document WO 2006/097952 is domestic and first of all comprises a pair of knife rolls through which the collected waste is shredded and reduced in volume. The shredded matter falls in the cradle of a screw conveyor which carries the matter by mixing it with water. Then comes a boiling step to hygienise and stop bacterial activity. A piston then presses the hygienised mixture through the hopper of a pan. Upon completion of this step, it is possible to obtain a coarse fraction on the one hand, a final fraction resulting from the pressing on the other. This fraction resulting from the pressing is compressed into a matrix so as to obtain a brick.

The method implemented in the known device aforementioned is particularly energy-greedy, requiring especially to bring a sludge to the boil, a mixture of organic matter and water.

The aim of the present invention is to remedy the drawbacks aforementioned while offering a method for processing organic waste as well as a domestic device for processing organic matter which is particularly little energy-greedy.

Other aims and advantages will appear in the following description, which is given only by way of example, and without being limited thereto.

BRIEF SUMMARY OF THE INVENTION

The invention concerns a domestic method for processing domestic waste, wherein the organic matter is collected, reduced in volume and stabilised so as to limit, even stop bacterial activity.

According to the invention, the method at least comprises the following steps, and carried out in order:

the organic matter is collected and loosely arranged, the water weight of the organic matter is reduced to stabilise said matter by subjecting said loose matter to a pulsed air flow, tapped off the surrounding air of the habitat, without other calorific uptake.

the volume of the stabilised organic matter is reduced, particularly by grinding, shredding, mixing, chopping, pressing.

The invention also relates to a domestic device for processing organic matter, suitable for implementing the method, including at least means to reduce the volume of the organic waste and means to stabilise the organic matter.

According to the invention, the device includes:

means to reduce the water weight of the organic matter to stabilise said matter, essentially consisting of ventilation means, means to reduce the volume of the stabilised organic matter, particularly by grinding, shredding, mixing, pressing, chopping.

BRIEF DESCRIPTION OF THE SEVERAL VIEWS OF THE DRAWINGS

The invention will be understood better when reading the following description accompanied by the appended drawings among which.

DETAILED DESCRIPTION OF THE INVENTION

Figure 1:
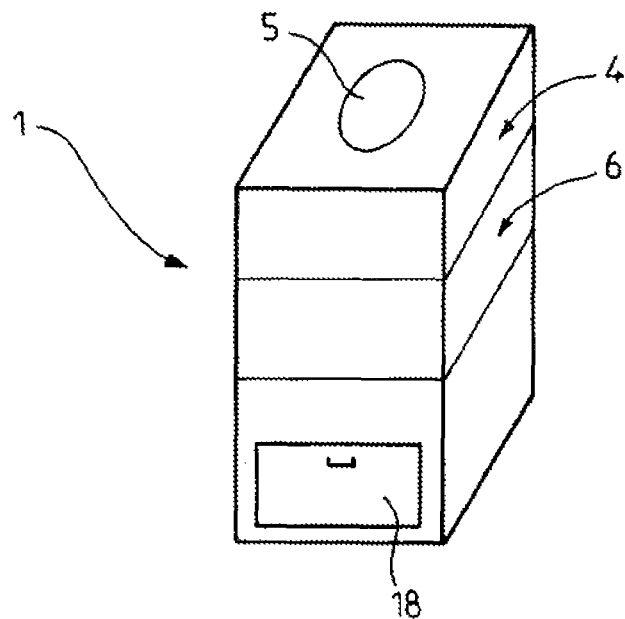
FIG. 1 is a perspective view of a device for processing matter according to the invention in a given embodiment.

The invention was born from the observation by the inventor that it is quicker and more energy saving to dry loose organic matter, than when they are reduced in volume and exhibit an exchange surface area with the lower air. Indeed, when "loose", the organic matter leaves numerous interstices and thus exhibits a larger exchange surface area with the air than when said matter is reduced in volume, in particular ground or compressed.

Thus, the method according to the invention in particular includes conducting the step of drying (step of reducing the water weight) the organic matter before the step of reducing the volume of the organic matter.

The invention thus concerns a domestic method for processing domestic waste, wherein the organic matter is collected, reduced in volume and stabilised so as to limit, even stop bacterial activity.

According to the invention, the method at least comprises the following steps, carried out in order:
   the organic matter is collected and loosely arranged,
   the water weight of the organic matter is reduced to stabilise said matter by subjecting said loose matter to a pulsed air flow, tapped off the surrounding air of the habitat, without other calorific uptake.
   the volume of the stabilised organic matter is reduced, particularly by grinding, shredding, mixing, pressing or chopping . . . .

By step of drying is meant below said step wherein the water weight of the organic matter is reduced.

According to the invention, the method is implemented in a domestic habitat. The air from the pulsed flux is thus tapped off the surrounding air of the habitat, without any other calorific uptake and hence without any heating. The inventor has observed that a pulsed air flow at a temperature of the order of 18 C or more was sufficient to drop the microbiological activity and stabilise the organic matter.

The step of reducing of the water weight of the organic matter must enable to stabilise the matter (to stop microbacterial activity and odours). This step of reducing may consist of partial or total drying of the organic matter. During these tests, the inventor has observed that a 60%-reduction of the water weight of the organic matter was sufficient to stabilise it.

The step of drying may spread over several hours, by subjecting said matter to said pulsed air flow. The duration of the step of reducing may range between 4 hours and 20 hours, even preferably between 8 hours and 16 hours, such as for instance 12 hours. The pulsed flux may be continuous or performed alternately throughout said duration.

The organic matter, object of the processing, is for instance meal waste, such as meat or fish residues, vegetable or fruit residues, which are of the order of 300 grams per day and per person, in average.

The method may advantageously be implemented by a device without any heating means, such as an electrical resistor or the like, particularly energy-greedy, for conducting the step of reducing the water weight of the organic matter.

In the method, the step of reducing the water weight of the organic matter can be implemented by means of an electrical fan whose consumption per unit can be smaller than 5 W, even smaller than 2 W.

The step of reducing the water weight of the organic matter may thus have an average consumption smaller than 10 watt-hour, even smaller than 4 watt-hour.

The step of reducing the organic matter may be, as developed, a step of grinding, of shredding, of mixing, of pressing, of mashing or any other volume reduction technique.

At the end of the day, the result is a domestic method, which is particularly little energy-greedy and simple to build. As illustrated on the figures according to an example, the step of matter stabilising can be carried out in a chamber which exchanges air with the outside so as to create the pulsed air flow. So as to prevent odours even contaminations, the air exchanged between the inside and the outside of the chamber 4 can be filtered, for example by means of active coal filters.

The next step of volume reduction of matter, especially by pressing, grinding, shredding or still chopping, can be carried out in the same chamber, sequentially, or still in another chamber, as illustrated according to the examples of the figures. The end-product obtained may be conditioned, in particular received in bags or sachets.

The invention also relates to a domestic device for processing organic matter suitable for implementing the method. This device includes at least means to reduce the volume of the organic waste and means to stabilise the organic matter.

According to the invention, the device moreover includes:
   means to reduce the water weight of the organic matter to stabilise said matter, essentially consisting of ventilation means (2),
   means 3 to reduce the volume of the stabilised organic matter, particularly by grinding, shredding, mixing, pressing, chopping, mashing.

The ventilation means 2 and the means 3 to reduce the volume of the stabilised organic matter may act in sequence, one after the other, in the same processing chamber or still in two distinct chambers.

The ventilation means 2 may in particular include one or several electrical fan(s). They may be low consumption fans, with a power of a 5 few watts only ranging in particular between 1 and 5 watts.

The means to reduce the water weight of the organic matter are advantageously deprived of electric resistors or any particularly energy-greedy heating member.

According to an embodiment, the device may include:
   a first chamber 4 for organic matter provided in particular with a feeding opening 5, said ventilation means 2 generating a pulsed air flow in said first chamber 4,
   a second chamber 6 containing said means 3 to reduce the volume of the stabilised organic matter,
   means 7 to move the organic matter from the first chamber 4 to the second chamber 6.

According to an embodiment, the ventilation means 2 may comprise a first fan 9 to pulse air from the outside to the outside of the first chamber 4 and a second fan 10 to extract air from the inside of said first chamber 4 to the outside. The device may include means to filter the air exchanged between the inside and the outside of the first chamber 4, in particular filters situated in an air tapping passage 20 and an air extraction passage 21.

According to an embodiment, time delay means are associated with said ventilation means 2 for generating the pulsed air flow, possibly said means 7 to move the organic matter from the first chamber 4 to the second chamber 6 or still associated with said means 3 to reduce the volume of the stabilised organic matter.

More particularly, the time delay means enable to actuate the ventilation or to stop it for carrying out an organic matter drying cycle It may be a drying cycle where ventilation is actuated continuously for a given period of time (for instance a duration ranging between 4 and 20 hours, preferably between 4 and 16 hours) or still an alternating drying cycle during which ventilation is successively cut off then stopped according to a given sequence. This alternating cycle is intended to limit the energy consumption of the device.

Possibly and so as to obtain uniform drying of the organic matter, the device may include means to reverse the direction of the pulsed air flow during the drying cycle. These means may in particular comprise a clock and control means for reversing the rotation direction of the fans.

At the end of the drying cycle, the time delay means may enable to actuate the means 7 to move the organic matter from the first chamber 4 to the second chamber, possibly then to actuate the means 3 to reduce in volume the organic matter in the second chamber 6.

According to another embodiment, controlling the drying sequence may be slaved by means of a hygrometry sensor targeting the humidity of the organic matter in the first chamber 4. When the hygrometry in the matter is lower than a given value, ventilation can be cut off and the matter is moved de la premiere to the second chamber to be reduced in volume.

According to an embodiment, the first chamber 4 is placed higher than the second chamber 6, wherein a passageway 11 is provided for the matter to fall, in particular by gravity, from the first chamber 4 to the second chamber 6.

According to another advantageous embodiment, a rotary drum 12 enables in particular said matter subjected to the pulsed air flow in the first chamber to be turned over. Advantageously, according to a non limiting example, this drum 12 may be tilted, possibly punched and combined in addition to the function for turning over the matter subjected to the pulsed air flow, a function for moving the organic matter.

The first chamber 4 can be fitted with a pan 13 for receiving the liquids associated with a drain 14, especially for separating the organic matter and the liquids, prior to drying.

Figure 2:
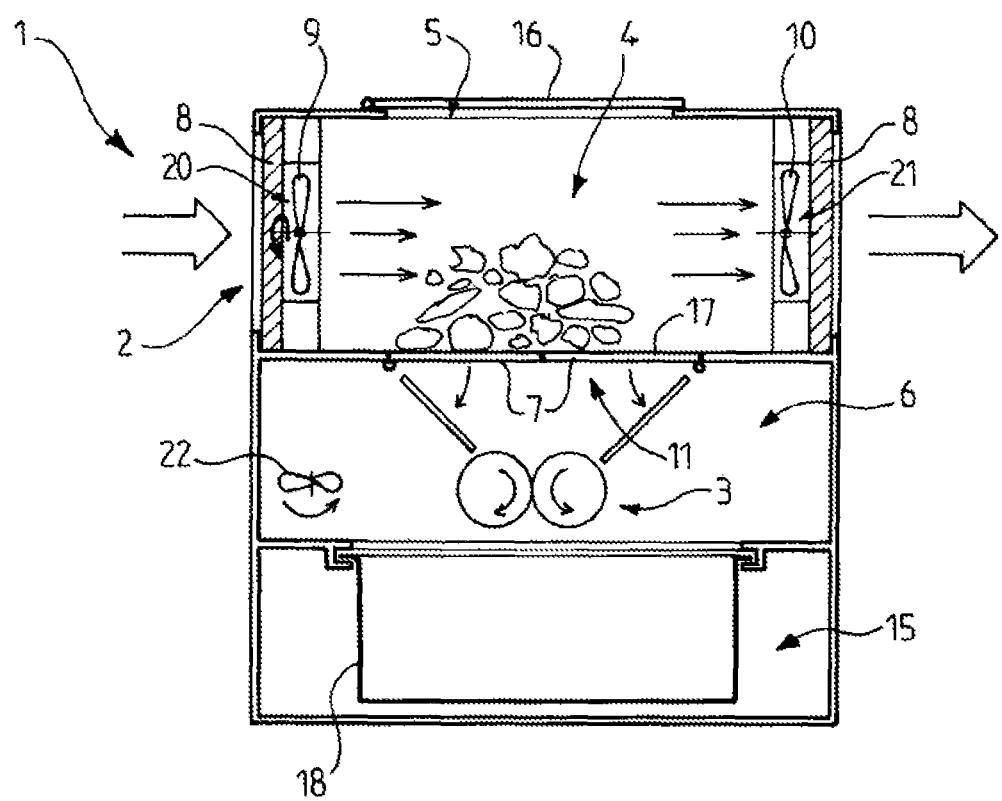
FIG. 2 is a diagrammatic sectional view of a device for processing organic matter according to the invention in a given embodiment.
Figure 3:
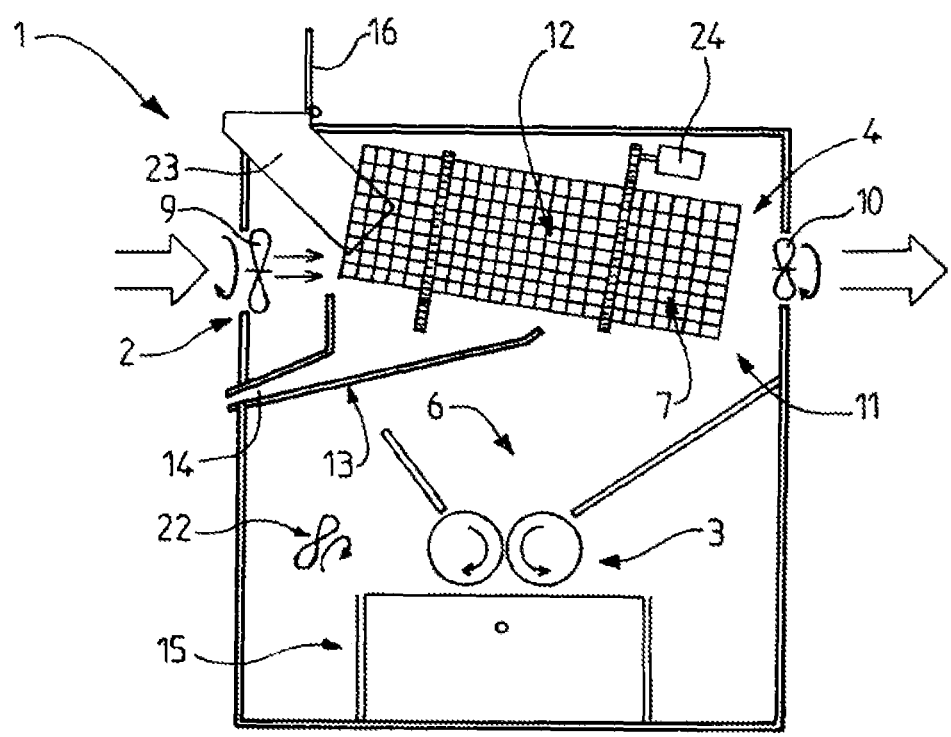
FIG. 3 is a diagrammatic view illustrating a device for processing organic matter according to the invention in a second embodiment.

We shall now describe two embodiments of the device according to the invention illustrated respectively on FIGS. 2 and 3.

The device according to the example of FIG. 2 is in the form of a bin compartmented into several chambers, namely from top to bottom, a first chamber provided with ventilation means 2, a second chamber provided with means 3 for reducing in volume and a third chamber 15 for storing the stabilised organic matter, after being reduced in volume.

In its upper portion, the device 1 exhibits a flap 16 for introducing the organic matter into the first chamber. A contactor for sensing when said flap 16 is open, enables to actuate two electric fans 9, 10 positioned respectively at the level of a first aperture forming an air scoop 20 and of a second aperture 21 forming an air exhaust aperture, or vice versa. Possibly, during the drying cycle, the rotation direction of the fans can be reversed for homogeneous drying of the matter in the first chamber. The aperture forming the air scoop and the aperture forming the air exhaust are then reversed.

Active coal filters can be placed for filtering the air exchanged between the first chamber and the outside air, in particular situated at the level of the so-called "exhaust" and "air scoop" apertures.

Once the drying time of the organic matter has expired, two shutters 17 of the bottom wall of the first chamber 4 are actuated to open, which causes the organic matter to fall towards a volume reduction mechanism.

This mechanism includes two rolls fitted with knives on their periphery for grinding the products.

The products are then conveyed and ground between the rolls and fall into the third chamber 15. This chamber in particular receives a container in the form of a drawer 18. This container may possibly receive a plastic bag or a sachet receiving the stabilised and ground matter.

Possibly, the device can also exhibit means 22 for slightly ventilating the second chamber 6 even the third chamber 15 where the organic matter is stored, so as to prevent the stabilised matter from reabsorbing the ambient humidity.

We shall now describe the example of FIG. 3. This example is also the form of a bin. The dimensions are sufficiently small to be integrated in a habitat, especially a kitchen. This bin comprises particularly from top to bottom:
  a first chamber 4 inside which the water weight of the organic matter is reduced,
  a second chamber 6 inside which the volume of the organic matter is reduced,
  a third chamber 15 for storing the matter.

This device includes an aperture closed by a flap 16 from which the waste is inserted, before it falls into a conduit up to an introduction end of a meshed and tilted drum 12. The liquids then pass through the meshed wall of the drum and drop into a receiving pan 13 which is provided with a drain 14.

Fans 9, 10, in particular two in number, enable to generate a pulsed air flow for drying the organic matter in the drum 12 and thereby reduce their water weight. Coal filters (non illustrated) enable to filter the air exchanged between the inside and the outside of the chamber 4.

An electric motor 14 whose axle is which is provided with a pinion meshes with a crown of the drum for driving it into rotation. The rotation of the drum not only enables to turn the organic matter over for optimised drying but also to move it forward according to the tilting direction of the drum, towards its other end. According to the tilting angle of the drum and the time necessary for drying, as the matter is being dried, the rotation of the drum can be continuous or still actuated by intermittent control means.

According to an example, when the drying cycle is completed and the drying time delay expired, the drum can be actuated in rotation, in particular continuously by a number of turns for evacuating the previously introduced waste. The waste then drops into the second chamber 3 in the direction of the means 3 to reduce the organic matter in volume.

These means to reduce the organic matter in volume may be in particular in the form of two knife rolls for being driven into reverse directions in order to compress and grind the products between the rolls. The stabilised and ground matter then drops in the third chamber 15 into a container in particular which is provided with a plastic or paper bag. Possibly, the device can also exhibit means for slightly ventilating the second chamber 6 as well as the third chamber 4, so as to prevent the stabilised matter from reabsorbing the ambient humidity.

Naturally, other embodiments could have been contemplated without departing from the framework of the invention defined by the claims below.

I claim:

1. A method of treating domestic organic matter in a habitat so as to reduce bacterial activity, the method comprising:
  collecting and loosely arranging the organic matter;
  reducing a water weight of the collected and loosely arranged organic matter by subjecting the collected and loosely arranged organic matter to a pulsed air flow tapped from surrounding air of the habitat without adding heat thereto so as to stabilize the organic matter; and
  reducing a volume of the stabilized organic matter by grinding, shredding, mixing or pressing.

2. The method of claim 1, further comprising:
turning over the collected and loosely arranged organic matter while subjected to the pulsed air flow.

3. The method of claim 2, the step of turning over comprising:
rotating a rotary drum so as to turn over the collected and loosely arranged organic matter while subjected to the pulsed air flow.

4. The method of claim 1, the step of reducing the water weight being carried out for a period of time of between 4 and 20 hours.

5. The method of claim 1, said pulsed air flow being generated by electric fans having an electrical consumption of less than 10 watts per hour.

6. The method of claim 1, the step of reducing the water weight being carried out by a ventilation means.

7. The method of claim 6, said ventilation means being directed to a first chamber, said first chamber having a feeding opening, the step of reducing the water weight comprising:
feeding the collected and loosely arranged organic matter into said first chamber through said feed opening, said ventilation means for directing the pulsed air flow into said first chamber.

8. The method of claim 7, the step of reducing a volume comprising:
moving the stabilized organic matter from said first chamber to a second chamber; and
reducing the volume of the stabilizing organic matter in said second chamber.

9. The method of claim 8, further comprising:
positioning said first chamber at a level that is higher than a level of said second chamber.

10. The method of claim 9, the step of moving the stabilized organic matter comprising:
gravity discharging the stabilized organic matter from said first chamber toward said second chamber.

11. The method of claim 7, the step of reducing the water weight comprising:
pulsing air by a first fan of said ventilation means from an exterior to an interior of said first chamber; and
extracting air by a second fan of said ventilation means for the interior of said first chamber to the exterior of said first chamber.

12. The method of claim 11, the step of reducing the water weight further comprising:
filtering the pulsed air and the extracted air.

13. The method of claim 7, said first chamber having a drain with a pan positioned below said drain, the method further comprising:
collecting liquids following through said drain with said pan.

* * * * *